July 31, 1923.

C. POLLAK 1,463,749

DEVICE FOR PREVENTING LEAKS

Filed June 3, 1921

Charles Pollak
INVENTOR

BY Victor J. Evans
ATTORNEY

WITNESS:

Patented July 31, 1923.

1,463,749

UNITED STATES PATENT OFFICE.

CHARLES POLLAK, OF HANCOCK, MICHIGAN.

DEVICE FOR PREVENTING LEAKS.

Application filed June 3, 1921. Serial No. 474,722.

*To all whom it may concern:*

Be it known that I, CHARLES POLLAK, a citizen of Germany, residing at Hancock, in the county of Houghton and State of Michigan, have invented new and useful Improvements in Devices for Preventing Leaks, of which the following is a specification.

This invention relates to attachments for hose carrying compressed air, water, steam, or in fact any fluid, and has for its object the provision of a device adapted to be clamped upon a hose at a weak point or at a point where the leak exists whereby to compress the hose and consequently cure the leak, at least temporarily.

An important object is the provision of a device of this character which is provided with novel clamping means for gripping it firmly upon the hose whereby to compress the hose at a weak or damaged spot.

An additional object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed and illustrated in the accompanying drawings in which—

Figure 1:
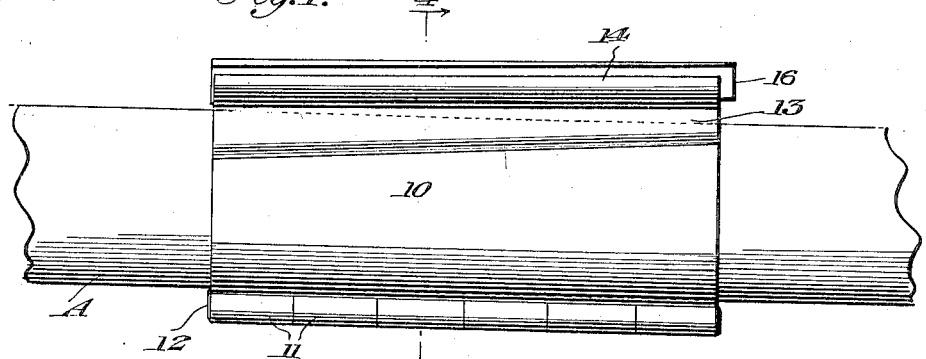
Figure 1 is a side elevation of my device associated with a hose.
Figure 2:
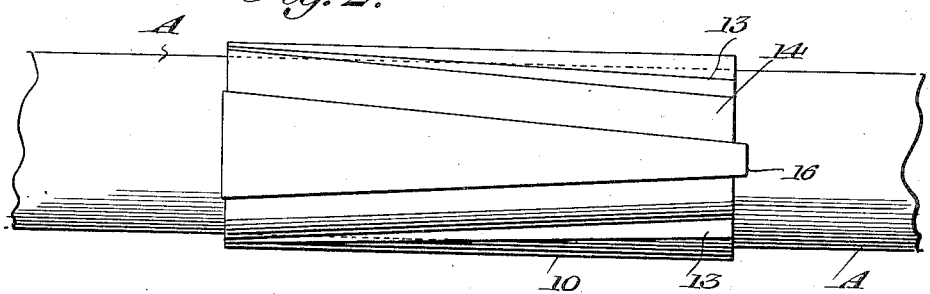
Figure 2 is an elevation at right angles to Figure 1.
Figure 3:
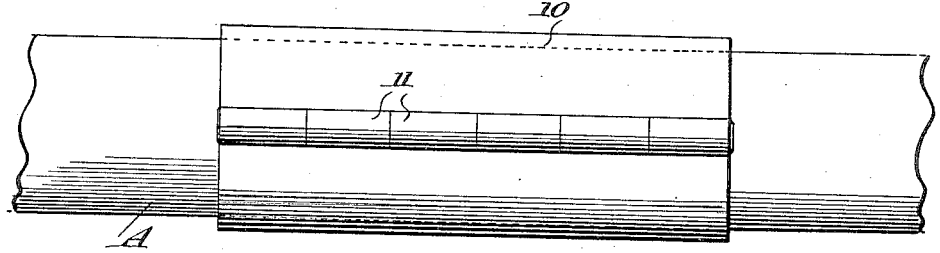
Figure 3 is an elevation at the side opposite to that shown in Figure 2.
Figure 4:
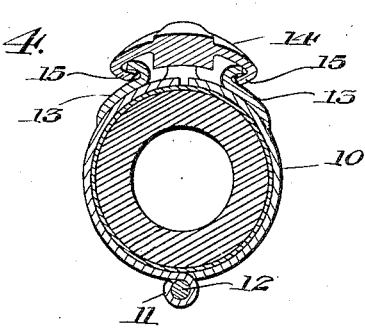
Figure 4 is a cross sectional view.

Referring more particularly to the drawings, I have shown my device as comprising a pair of substantially semi-cylindrical plates 10 which are formed at one edge with interfitting knuckles 11 pivotally connected by a pintle 12 whereby the plates may be moved apart so as to be engaged upon a hose A or the like which may be used for conducting any fluid such as water, compressed air, or the like.

Secured or formed upon the other edges of the plates 10 are outwardly extending flanges 13 which converge toward one end of the device, as clearly shown. The clamping means comprises a trapezoidal shaped clamp 14 which is provided with inturned side flanges 15 engaging the flanges 13.

In the use of the device it is of course understood that initially the clamp 14 is disengaged from the plates 10 so that the plates 10 may be swung open upon the pintle 12 and placed about a weak spot or a damaged spot in a fluid conducting hose. After being placed in position the plates 10 are pressed together as much as possible and the clamp 14 is then associated therewith by engaging the flanges 15, at the side end of the clamp with the flanges 13 at the narrowest points of the latter. The smaller end of the clamp is provided with a projection 16 which is relatively thick and designed to receive the impact of blows from a hammer or the like whereby the clamp 14 may be driven longitudinally with respect to the plates 10 so that the converging flanges 15 of the clamp cooperatively engaging the converging flanges 13 will result in drawing the plates 10 together so as to compress the hose at the point to be reinforced. It is of course understood that the device is thus positioned and clamped upon the hose before pressure is forced through the latter.

From the foregoing description and a study of the drawings it will be apparent that I have thus provided an extremely simple and consequently inexpensive device adapted to be clamped upon a hose or the like to compress the same for preventing or curing leaks. It is to be noted that the device may be applied in a remarkably short time and that it will consequently be a great time and labor saver, especially in emergency cases.

While I have shown and described the preferred embodiment of my invention, it is of course to be understood that I reserve the right to make such changes in the form, construction and arrangement of parts as will not depart from the spirit of the invention or the scope of the subjoined claim.

Having thus described my invention, I claim:

A device of the character described comprising pair of similar substantially semi-cylindrical clamping members hingedly connected at one edge and adapted to be engaged upon a flexible conductor in embracing relation thereto, flanged members on said clamping members in spaced relation to the other edges thereof, said flanged members having their flanges converging longitudinally and turned outwardly, and a clamping device formed as a trapezoidal shaped body having converging side flanges engageable upon said first named flanges whereby when said last named clamping member is moved longitudinally in one direction with respect to said semi-cylindrical clamping members, the latter will be drawn into compressing engagement with the conductor, the spacing of said flanged members from the edges of the semi-cylindrical clamping members permitting the free edges of the latter to be drawn closely together whereby substantially the entire periphery of the flexible conductor will be compressed.

In testimony whereof I affix my signature.

CHARLES POLLAK.